Feb. 11, 1947.  C. FARROW  2,415,789
NON-DESTRUCTIVE ELECTRICAL TESTING OF METALS
Filed June 13, 1942
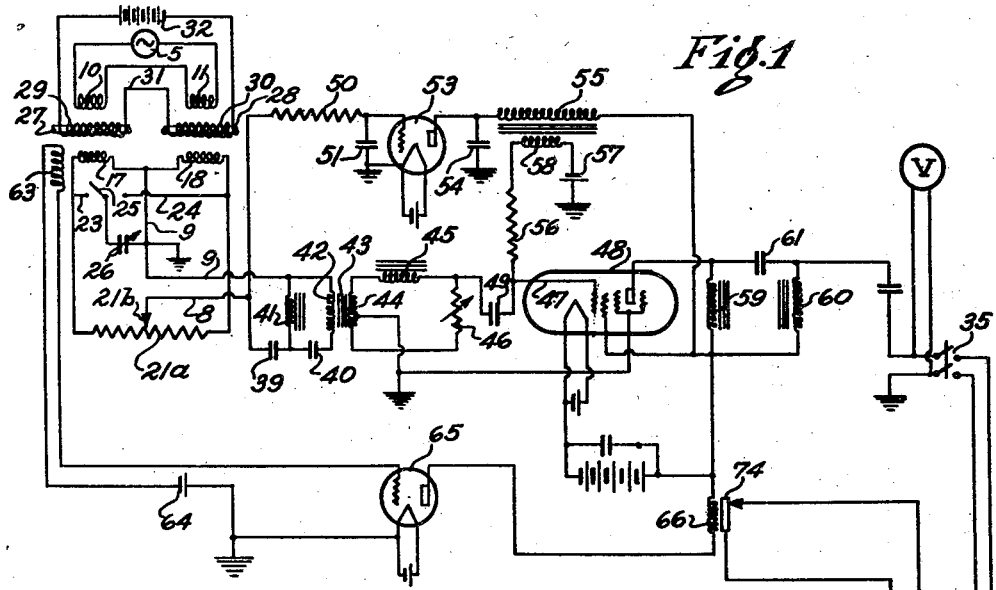
Fig.1
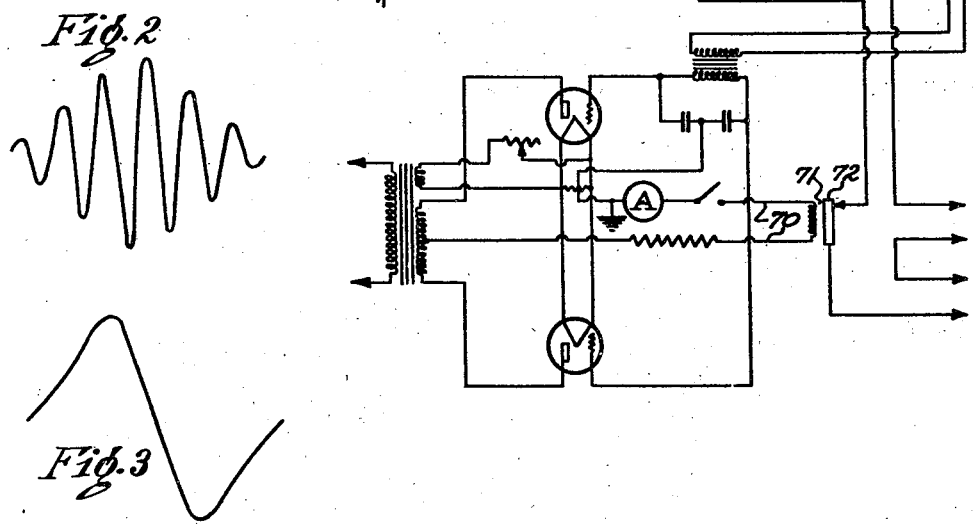
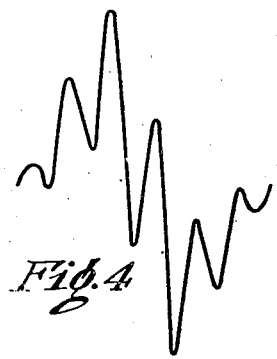
Fig.2
Fig.3
Fig.4
Fig.5
Fig.6
INVENTOR.
CECIL FARROW
BY Richey & Watts
ATTORNEYS Patented Feb. 11, 1947

2,415,789

UNITED STATES PATENT OFFICE 2,415,789

NONDESTRUCTIVE ELECTRICAL TESTING OF METALS

Cecil Farrow, Bainbridge Township, Geauga County, Ohio, assignor to Republic Steel Corporation, Cleveland, Ohio, a corporation of New Jersey Application June 13, 1942, Serial No. 446,907

19 Claims. (Cl. 175—183)

This invention relates to methods and apparatus for the non-destructive testing of metal articles for defects, and more particularly to the testing of magnetic articles although certain phases of the invention may be applicable to non-magnetic articles. The invention is especially adapted to the testing of metallic tubing, rods, bars and the like and comprises an improvement in the method and apparatus shown and described in United States Letters Patent to Horace C. Knerr and Cecil Farrow No. Re. 21,003 of February 14, 1939.

Patent No. Re. 21,003 contemplates testing magnetic metal articles by subjecting them to a magnetic field obtained by passing direct current through a coil or solenoid surrounding the articles to substantially saturate the article magnetically. This magnetic saturation renders the article being tested substantially non-magnetic with respect to the testing current. The testing current is an alternating current which is applied to a primary circuit including a circular winding coaxial with the tube, and this current induces a current in a secondary placed in inductive relationship to the tube. Although the application of the direct current to the article under test to saturate the article magnetically as shown in the aforementioned patent is a material improvement in this field of testing, it is found in practice that certain magnetic variables other than those caused by defects have an undesirable effect on the testing procedure. That is, although the direct current magnetic saturation method is intended to eliminate the magnetic effects of the article under test, there are certain magnetic variables that heretofore could not be controlled. That is, in a tube or other elongated structure, certain characteristics of the molecular structure of the article itself cause its magnetic or magnetically saturable properties to vary throughout its length. This results in certain parts of the article having higher magnetic properties, even when saturated, than other parts of the article. These properties are not necessarily defects since permeability or reluctance differences in one part of the tube over another part do not necessarily cause the tube or bar to be weaker or stronger in one place than in another. However, these characteristics do show up during the testing for the undesirable defects such as cracks, slag inclusions and the like, and often occur at the same time as a defect, which renders it difficult to recognize the presence of a defect. These conditions make it especially difficult to locate very small defects.

In testing lengths of tubes or other articles, a signal, although of a higher magnitude, is recorded when the tube end passes through the tester. These signals in ordinary routine testing occur at regular intervals and the operator usually learns to ignore them, recognizing them as being signals caused by the abutting ends of the tubes. The very fact that the operator learns to ignore the signals, however, is undesirable because if the operator should relax his vigilance he is apt to pass a defect believing it to be a tube end.

It is, therefore, an object of this invention to provide an improved method and apparatus for the non-destructive testing of tubes.

Another object of the invention is to provide an improved method and apparatus for eliminating the effect caused by magnetic variables and which are not indicative of undesirable defects.

Another object of the invention is to provide an improved method and apparatus for eliminating or modifying the signal due to the tube ends and eliminating the probability of major defect signals being mistaken for tube end signals.

Another object of the invention is to provide an apparatus capable of locating smaller defects than was heretofore possible.

Still other objects of the invention as well as the manner of carrying out the invention itself will become more apparent from the following description of an embodiment of the invention, which description is illustrated by the accompanying drawing and forms a part of this specification.

Referring to the drawing:

Fig. 1 is an electrical circuit diagram illustrating an embodiment of my invention;

Figs. 2 to 6 inclusive are wave form diagrams illustrating the wave form of the signals at different points in the circuit as observed during the testing of a tube.

Referring now to the drawing throughout which like parts are designed by like reference characters and particularly to Fig. 1 wherein the similarities of that figure to Fig. 5 of the aforesaid reissue patent, can be seen; the direct current saturation coils are illustrated at 29 and 30 being energized by the battery 32 and coupled in series with each other as indicated at 31. The alternating current magnetizing primary coils for inducing alternating flux are indicated at 10 and 11 adapted to be energized by a source of alternating current 5. The secondary coils are illustrated at 17 and 18. It will be understood that these various coils are all arranged so that a standard article 27 may be disposed in coils 10, 17 and 29, and the tube or rod 28 under test may be passed through the other series coils 11, 18 and 30, each of which is series connected to corresponding coils of the standard, the coils being arranged in units as disclosed in the said reissue patent. The coils may also be arranged so that tube or rod 28 under test will pass in turn through both sets making one part of 28 a standard while another part is under test.

The pickup coils 17—18 have induced in them an alternating current from the coils 10—11; a resistance 21a connects the ends of the coils together and a slider 21b movable along the resistance provides an output connection which is connected to the input lead 8 of a circuit to be described later. The other input lead is connected by lead 9 to the junction of the coils 17—18, which lead is also connected to ground.

In operation the currents induced in pickup coils 17 and 18 are first balanced; this is accomplished in the same manner as described in the reissue patent, namely, by opening the output of the amplifier circuit by the double pole single throw switch 35 to disconnect the thyratron detecting device with the standard and tubes to be tested 27—28 in position. in the coil assemblies. The switch 25 is alternately shifted to leads 23 and 24 and slider 21b moved on resistance 21a and the condenser 26 varied until the two circuits are in balance. Most of the alternating voltage in coil 18 is balanced out of the circuit by the coil 17 of the standard and when so balanced any small variation in the voltage pickup due to defects become a comparatively large part of the total voltage applied to the detector circuit through the amplifier.

At this point it will be well to take note of the fact that when even a perfect tube such as 28 is moved through the coil unit 11—18—30, even though it is supposed to be magnetized to saturation by coil 30, some voltage variations are produced across the output 8—9. This may be due to magnetic variations within the tube which are not necessarily defects.

When the device is adjusted as described in said patent the switch 35 is closed. The circuit is then unbalanced by moving the slider 21b or resetting condenser 26 or both, which adjustment will produce a voltage across the output connections 8—9 almost in phase with the voltage across the pickup coils 17—18. A magnetic variation in the article being tested may cause a momentary increase in the A. C. voltage at 8—9. This results in a modulation of the voltage illustrated in the wave form of Fig. 2. Also the magnetic variation may generate a low frequency voltage having a wave form as shown in Fig. 3. This voltage is of relatively low and variable frequency which when superimposed on the testing voltage induced in the coil 18 combines with the form of Fig. 2 to produce a composite wave form as shown in Fig. 4.

It is desirable that the circuit be so adjusted that it is highly sensitive to phase-shift in the voltage output of the amplifier, and still be insensitive to changes in amplitude of this voltage caused by the magnetic variations. When testing for small defects, however, the circuit may have to be set to such close tolerances that a voltage such as shown in Fig. 4 would cause a signal, even if there were no phase shift; or a phase shift might in some cases be prevented from causing a signal. Therefore it is proposed to so arrange the circuit and utilize the low frequency component of this voltage, due to magnetic variations in the substance under test to prevent a signal being caused by the accompanying modulation of this voltage since, as previously stated, magnetic variations are not necessarily defects such as it is desired to be indicated; it is also proposed by these means to keep the circuit sensitive to a defect while such harmless magnetic variable is passing through coils 10, 17 and 29.

The means for accomplishing this is best shown in Fig. 1. When voltage having a wave form such as is shown in Fig. 4 appears across the leads 8 and 9 and is applied to the amplifier section of the circuit, it first encounters a filter disposed in the input circuit to the amplifier and comprising series connected condensers 39 and 40 and the shunt inductance 41, the values of which will be so chosen as to remove the low frequency component and pass on to the primary 42 of the input transformer 43 of the phase shifting circuit only the original testing wave modulated by the harmless magnetic variable such as shown in Fig. 2. From the secondary 44 of the transformer 43, the voltage passes through the phase-shifting circuit which comprises the secondary winding 44, the inductance 45, and the variable resistance 46 which has its other end connected to the other end of the secondary 44. The secondary 44 has a grounded center tap as shown. The output of the phase shifting circuit is connected through the coupling condenser 49 to the grid 47 of the amplifier tube 48.

The signal is also fed from the output of 8—9 to a circuit which includes a resistor 50 and capacity 51, the purpose being to separate the low frequency signal (Fig. 3) from the testing frequency signal (Fig. 2) as shown compositely in Fig. 4. By properly proportioning the resistance 50 to the condenser 51, a voltage wave such as shown in Fig. 5 is provided across the condenser 51 when a wave such as shown in Fig. 4 is applied to leads 8 and 9. This wave includes only part of the test frequency voltage and in it the voltage reversal of the low frequency wave of Fig. 3 has been substantially eliminated. The amplitude of this voltage is only a small part of the amplitude of the original wave, it being shown on a large scale for the purpose of comparison as to shape.

This signal is then fed to the input grid of the tube 53 where it is amplified. A condenser 54 in the anode circuit has a smoothing effect on this current still further removing the remaining ripple. The resulting smooth wave is applied to the primary 55 of the transformer, the other end of the primary being connected to the same voltage supply lead that supplies voltage for the screen grid of the tube 48.

The secondary 58 of the transformer feeds the amplified wave through the resistor 56 to the control grid 47 of the tube 48. This tube may be a super control amplifier tube of a type such as 1A4. A biasing battery 57 connects the other end of the transformer secondary 58 to ground.

The tube 48 is a variable gain tube, one of the characteristics being that the gain of the tube can be varied by varying the grid bias. The effect of applying this low frequency voltage to the grid 47 is to vary the grid bias thus varying the amplification of the tube. This varying of amplification necessarily occurs in synchronism with the modulation of the testing frequency voltage from the pickup coil 17 as shown in Fig. 2 due to the magnetic variable passing through the test coil 18. Obviously the polarity of the transformer is so selected that when the amplitude of the testing frequency wave (Fig. 2) increases, the bias is increased and the amplification of the tube 48 decreased. The result is that the testing frequency output from the tube 48 remains substantially constant regardless of magnetic variables in the tube under test providing a wave form substantially as shown in Fig. 6. Although it may not be necessary to compensate quite so fully as indicated here.

In addition to the test frequency output from tube 48, there is a low frequency output due to the low frequency impressed on the grid to control the amplification. This is filtered out by a filter comprising inductances 59—60 and condenser 61.

Any shift in phase of the voltage in the leads 8—9 will still remain, however, which leaves the amplifier circuit sensitive to such tube variables as produce phase-shift the same as in the aforesaid reissue patent.

The operation of the device otherwise is like that described in the aforesaid reissue patent. That is, with a good tube in the test coil the resistance 46 is adjusted to control the phase of the current until the thyratron tube device will pass full current when no defects are present. That is, when a perfect tube is passing through the device the full current flows in the thyratron tube device. The output 70 of the thyratron tube circuit operates a relay 71 to hold the contacts 72 open. When a defect passes, the phase shift in the output of the amplifier causes the amplifier to gain control of the thyratron circuit through the grids of the thyratron, causing current to cease flowing. This deenergizes the relay 71, allowing the contacts 72 to close. The contacts 72 control a circuit which causes an alarm to be sounded and/or controls a paint spraying device which is arranged to spray paint on the tube at the place where the defect is located.

As previously stated, there has been incorporated in this circuit means for eliminating the signal due to tube ends passing through the coils. In this instance an auxiliary coil 63 is included with the others. This coil may be disposed as shown in Fig. 1 as to be insensitive to signals due to the field produced by primary coil 29 but sensitive to those of predetermined magnitude produced by tube ends or other magnetic variable passing through the field of saturating coil 29. One end of the coil is grounded. The other end is connected to the grid of the tube 65, which grid is biased by a battery 64 adjacent the cathode, which cathode is also grounded. The output from the tube 65 controls a relay 66. Signals due to the tube ends energize the relay opening relay contacts 74. Since these contacts are in series with the contact 72 of the thyratron circuit relay 71 the closing of these contacts 72 due to the tube end signal in the main circuit is of no consequence because the contacts 74 are open at this time.

It should also be noted that it may be inconvenient to place the coil 63 as indicated in the drawing. In this instance, the coil could be placed concentric with the other coils and this portion of the circuit so biased and filtered that the tube 65 only amplifies on low frequency signals of a predetermined magnitude. There may also be occasions where it is desirable to position the coil 63 some place in the path of travel of the tube ahead of the testing coils such as 17. In this case, a suitable time delay is introduced into tube relay circuit 65—66 so that the end signal causes the relay to operate at the time the end signal is being picked up by the coil 17.

It will thus be seen that I have provided a tube testing device and circuit wherein extremely small defects can be located without affecting the tube structure. Furthermore, variations in the magnetic structure of the tube have little or no effect on operation of the apparatus, and that such variations do not show up as tube defects. Furthermore, the effect of tube end signals in such a device is substantially eliminated and the possibility of error and the overlooking of defects in tubes being tested is materially reduced.

Having thus described my invention in an embodiment thereof, I am aware that numerous and extensive departures may be made therefrom without departing from the spirit or scope of the invention.

I claim:

1. The method of testing articles for defects which comprises generating a signal, causing the undesirable physical characteristics of an article under test to phase modulate said signal, incidental amplitude modulations being caused by characteristics of the article other than undesirable defects, amplifying the modulated signal with amplification of components thereof selectively diminished in accordance with intensity of amplitude modulations of the modulated signal and detecting the amplified signal.

2. The method of non-destructive testing for defects in an elongated article which comprises generating a signal of constant amplitude and frequency causing the undesirable physical characteristics of said article to phase modulate said signal, selecting from said signal any amplitude modulations components present due to said article characteristics other than undesirable characteristics, detecting said phase modulations and using said amplitude modulating component removed to prevent the detection of the amplitude modulations present in said signal.

3. The method of testing for defects in tubing having variations in its magnetic properties along its length which comprises causing the tubing to control the form of a generated signal, taking from said signal certain transients caused by the magnetic variations along the length of the tube, amplifying said generated signal and controlling the amplification of said signal by current derived from said transients to prevent amplification of the transient variations.

4. The method of testing for defects in rods, tubes or the like having magnetic variations in their structure which comprises generating a signal, causing said signal to be modulated by the defects and magnetic variations of the material being tested, removing a portion of said modulated signal and selecting therefrom the portion caused by the magnetic variations and converting that portion of the removed signal due to magnetic variations to a varying direct current which varies in proportion to said magnetic variations, and amplifying the remainder of the signal and using said varying direct current due to the magnetic variation to control the amplification of said signal to prevent the magnetic variation signals from being amplified.

5. The method of eliminating magnetic variables in magnetic testing wherein an article to be tested is passed through an alternating current field and the variations in the field due to defects causes a phase shift in the current in said field which comprises removing from said current a voltage component due to said magnetic variations and using said removed voltage component to control the amplification of the signal to maintain the signal of constant amplitude in the presence of magnetic variations.

6. A magnetic testing circuit including means to apply an alternating current to an article being tested, a bridge circuit having currents induced therein from said applied current and arranged to be balanced, one leg of said bridge circuit arranged to be unbalanced when an article having undesirable characteristics is moved in proximity thereto, an amplifier circuit connected to the bridge circuit, and means connected to the output of the amplifier to indicate a condition of unbalance in the bridge current, a subsidiary circuit arranged to be sensitive to and amplifying voltage variances in said bridge circuit arising from causes other than undesirable characteristics in the article being tested and having its output connected to the amplifier circuit to control said amplifier circuit against amplifying said last mentioned voltage variations 7. In combination with an apparatus for the nondestructive testing of elongated articles including an inductively coupled primary and secondary circuit with means for introducing an alternating current of constant amplitude into the primary circuit, said inductances being arranged to allow an article to be tested to be moved in proximity thereto and when so moved to cause an effect on the current induced in the secondary circuit and means for detecting defects in said article by determining the reactions of the secondary circuit to said article including an amplifier and a detector; means for eliminating the effects of variable magnetic properties in said article comprising a second amplifier circuit connected to said secondary circuit, a filter in the input of the amplifier circuit for filtering out all but voltage changes due to said magnetic variation, the output of said second amplifier circuit being connected in controlling relation to the main or first amplifier circuit to hold said first amplifier circuit output constant in the presence of magnetic variations and to prevent said magnetic variations from being detected in said detector.

8. In an apparatus for the non-destructive testing of elongated articles, a pickup circuit including series connected inductances arranged to have a standard elongated article passed through one inductance and an elongated article to be tested passed through the other inductance, said inductances constituting a secondary circuit and connected and arranged to have the balance of the currents in the circuit determined to provide a predetermined output, a primary circuit for applying an alternating current to the secondary circuit, and a saturation circuit for applying a direct current to said articles to magnetize said articles; an amplifier circuit for amplifying the output of the pickup circuit connected to the pickup circuit, and a detector circuit connected to the amplifier circuit and arranged to indicate a phase shift in the output of the pickup circuit, means for eliminating voltage variations caused by magnetic variables in the article under test comprising a subsidiary amplifier circuit connected to the pickup output, and filter means interposed in the input to said subsidiary circuit to pass only voltages variations due to said magnetic variables, said amplifier adapted to amplify said voltages variation and having the output circuit connected to said first amplifier circuit to control the amplification therein and hold said amplifier against amplifying voltages due to said magnetic variables and provide an output of even magnitude, said amplifiers amplifying only signals having a shift in phase in currents to its input due to changes in the pickup circuit caused by defects in the article under test.

9. A circuit for non-destructive testing of metallic articles including a bridge circuit having inductances in at least two of the legs, means for inducing alternating current in the bridge circuit, said inductances arranged to have a standard article moved in proximity to the inductances of one leg and an article under test in proximity of the other leg, said article adapted to upset the balance of said circuit when undesirable characteristics in the article under test passes one of the inductances, an amplifier circuit for amplifying the output of the bridge circuit and an indicator operated by the amplifier to indicate a state of unbalance in the bridge circuit, a subsidiary circuit connected to the output of the bridge circuit and responsive to voltage variations in said circuit caused by characteristics of the article under test other than undesirable characteristics to amplify said last mentioned voltage variations and having its output connected in controlling relation to said amplifier to hold said amplifier output against amplitude variations due to voltage variations caused by characteristics of the article under test other than undesirable.

10. A circuit for non-destructive testing of metallic articles including a bridge circuit having inductances in at least two of the legs, means for inducing alternating current in the bridge circuit, said inductances arranged to have a standard article moved in proximity to the inductances of one leg and an article under test in proximity of the other leg, said article adapted to upset the balance of said circuit when undesirable characteristics in the article under test passes one of the inductances, an amplifier circuit for amplifying the output of the bridge circuit and an indicator operated by the amplifier to indicate a state of unbalance in the bridge circuit, a subsidiary circuit connected to the output of the bridge circuit and responsive to voltage variations in said circuit caused by magnetic variations in the article under test to amplify said voltage changes due to magnetic variation and having its output connected in controlling relation to said amplifier to hold said amplifier output against amplitude variations due to voltage variations caused by magnetic variations of the article under test.

11. In non-destructive testing of the type described using a strong direct current field, the method which consists of utilizing a voltage produced by the change in direct current flux as the end of the article passes near or through a coil to render inoperative the normal signal apparatus.

12. The method of non-destructive testing which comprises eliminating the effect of signals arising due to the passage of the ends of the articles through testing apparatus by utilizing the end signal to bias the signaling apparatus to a non-signalling state.

13. The method of elimination of end signals in a non-destructive tube testing apparatus utilizing a strong direct current field which comprises causing the end of the article to produce a voltage change within predetermined levels, and using said voltage change to control said signal apparatus to prevent the normal signalling operation of said apparatus.

14. An apparatus of the class described including a circuit for generating signals due to defects in an article under test, means to prevent said article from signalling the passage of the ends of the tubes including pickup means sensitive to signals due to the passage of the end of the article and a circuit for amplifying said signals, and a relay for opening and closing said signal circuit connected to said amplifier circuit and arranged to open said signal circuit during the passage of said article ends.

15. An apparatus of the class described including a pickup circuit sensitive to current and voltages changes due to the passage of an article under test in proximity thereto, means connected to said pickup circuit including an amplifier circuit for amplifying said signals and a detector circuit for detecting phase shift in said signals, and signalling means in the output of said detector circuit for indicating the presence or absence of phase shift in said signals; means for preventing said signalling apparatus from indicating signals due to the passage of the ends of the articles through said apparatus including a second pickup means disposed in proximity to the passage of said article and arranged to be sensitive to signals of predetermined magnitude due to the ends of the article and amplifying means for amplifying said signals and a relay operatively connected to said amplifier output for opening said signal circuit and preventing the generation of a signal when the article ends pass through the apparatus.

16. An apparatus of the class described including a pickup circuit sensitive to current and voltages changes due to the passage of an article under test in proximity thereto, means connected to said pickup circuit including an amplifier circuit for amplifying said signals and a detector circuit for detecting phase shift in said signals, and signalling means in the output of said detector circuit for indicating the presence or absence of phase shift in said signals; means for preventing said signalling apparatus from indicating signals due to the passage of the ends of the articles through said apparatus including a second pickup means disposed in proximity to the passage of said article and arranged to be sensitive to signals caused by the ends of the articles and amplifying means for amplifying said signals and connected to said signalling means to hold said signalling means against signalling upon the passage of the ends of the article through the apparatus.

17. The method of testing for defects in an elongated article having variations in its magnetic properties along its length which comprises causing the article to control the form of a generated signal, taking from said signal certain transients caused by magnetic variations along the length of the tube during the passage of the article through a direct current field, amplifying said generated signal and controlling the amplification of said signal by currents derived from said transients to prevent amplification of the transient variations.

18. The method of testing for defects in rods, tubes or the like having magnetic variations in their structure, which comprises generating a signal, causing said signal to be modulated by the defects and magnetic variations of the material being tested, removing the portion of said modulated signal caused by the passage of magnetic variations through a direct current field and converting that portion to a varying direct current which varies in proportion to said magnetic variations, and amplifying the remainder of the signal and causing said varying direct current due to the magnetic variation to control the amplification of said signal to prevent the magnetic variation signals from being amplified.

19. The method of eliminating magnetic variables in magnetic testing wherein an article to be tested is passed through an alternating current field and the variations in the field due to defects causes a phase shift in the current in said field which comprises removing from said current components due to the passage of said magnetic variations through a direct current field and using said removed voltage components to control the amplification of the signal to maintain a signal of constant amplitude in the presence of said magnetic variations.

CECIL FARROW.

REFERENCES CITED

The following references are of record in the file of this patent:

UNITED STATES PATENTS

| Number | Name | Date |
| --- | --- | --- |
| 2,290,330 | Irwin | July 21, 1942 |
| 2,102,451 | Zuschlag | Dec. 14, 1937 |
| Re. 21,003 | Knerr et al. | Feb. 14, 1939 |
| 2,098,991 | Zuschlag | Nov. 16, 1937 |
| 2,346,830 | De Lanty | Apr. 18, 1944 |